(12) United States Patent
Sanderson et al.

(10) Patent No.: US 11,215,224 B2
(45) Date of Patent: Jan. 4, 2022

(54) ROLLING APPARATUS WITH PROFILED V-GUIDE

(71) Applicant: Punching Concepts, Inc., Alpena, MI (US)

(72) Inventors: Edward Sanderson, Alpena, MI (US); Matthew Gies, Alpena, MI (US); Patrick Kelly, Herron, MI (US)

(73) Assignee: PUNCHING CONCEPTS, INC., Aplena, MI (US)

( * ) Notice: Subject to any disclaimer, the term of this patent is extended or adjusted under 35 U.S.C. 154(b) by 0 days.

(21) Appl. No.: 16/837,354

(22) Filed: Apr. 1, 2020

(65) Prior Publication Data

US 2021/0310516 A1 Oct. 7, 2021

(51) Int. Cl.
| | |
|---|---|
| *F16C 19/24* | (2006.01) |
| *F16C 29/04* | (2006.01) |
| *F16C 29/00* | (2006.01) |
| *E05D 15/06* | (2006.01) |
| *F16H 7/18* | (2006.01) |

(52) U.S. Cl.
CPC ............ *F16C 19/24* (2013.01); *F16C 29/005* (2013.01); *F16C 29/04* (2013.01); *E05D 15/0652* (2013.01); *F16C 2240/42* (2013.01); *F16C 2240/46* (2013.01); *F16C 2240/50* (2013.01); *F16H 7/18* (2013.01); *F16H 2007/185* (2013.01)

(58) Field of Classification Search
CPC ........ F16C 19/24; F16C 29/005; F16C 29/04; F16C 2240/42; F16C 2240/46; F16C 2240/50; B23Q 1/40; B23Q 1/621; E05D 15/0652; F16H 7/18; F16H 2007/185
USPC .......... 384/10, 13, 55, 57, 58; 104/106, 119; 16/91, 96 R, 101
See application file for complete search history.

(56) References Cited

U.S. PATENT DOCUMENTS

| | | | | |
|---|---|---|---|---|
| 1,895,607 | A | | 1/1933 | Coe |
| 2,068,166 | A | * | 1/1937 | Dodge ..................... B23K 5/08 219/124.22 |
| 2,332,386 | A | * | 10/1943 | Lemon ................... B63B 19/22 114/201 R |

(Continued)

FOREIGN PATENT DOCUMENTS

| | | | | |
|---|---|---|---|---|
| CA | 2469617 | C * | 4/2008 | ............. B23Q 1/621 |
| DE | 4237571 | A1 * | 5/1994 | ............ F16C 29/048 |

(Continued)

OTHER PUBLICATIONS

Load Bearing Roller Assemblies, PCI, pp. 163-205 including cover page, 2015.

*Primary Examiner* — Marcus Charles
(74) *Attorney, Agent, or Firm* — Warner Norcross + Judd LLP

(57) ABSTRACT

A profiled rolling apparatus for lowering rolling resistance in track-guided, load-bearing movement applications. The rolling body, as part of a track roller, cam follower, caster wheel, or the like, has a radial groove (e.g. a V-shape with some internal angle) on which a non-linear profile is implemented. Profiles for various embodiments may be, but are not limited to, circular arcs, polynomials or other mathematical functions, or made up of multiple shorter linear and/or arc segments, creating a convex or concave contour on either side of the groove. Such crowning profiles may additionally or alternatively be implemented on the guiding track.

16 Claims, 2 Drawing Sheets

(56) References Cited

U.S. PATENT DOCUMENTS

| | | | |
|---|---|---|---|
| 2,349,281 A | 5/1944 | Kendall | |
| 2,512,204 A * | 6/1950 | Gould | B23D 45/18 |
| | | | 83/306 |
| 3,093,424 A * | 6/1963 | Pernetta | E05D 15/0652 |
| | | | 384/10 |
| 3,140,129 A | 7/1964 | Koss | |
| 3,552,805 A * | 1/1971 | Dunlap | F16C 29/045 |
| | | | 384/55 |
| 3,878,614 A * | 4/1975 | Bruneau | B43L 13/045 |
| | | | 33/438 |
| 3,977,736 A | 8/1976 | Pinter | |
| 4,199,052 A | 4/1980 | Morris | |
| 4,520,733 A * | 6/1985 | Willmann | E01B 25/24 |
| | | | 104/110 |
| 5,005,988 A | 4/1991 | Lyon | |
| 5,542,900 A | 8/1996 | Burke | |
| 5,735,214 A * | 4/1998 | Tsuboi | F16C 29/005 |
| | | | 104/106 |
| 6,394,496 B1 * | 5/2002 | Piona | B60P 3/226 |
| | | | 220/1.5 |
| 6,564,722 B1 * | 5/2003 | Kurosawa | F16C 29/045 |
| | | | 104/155 |
| 7,114,904 B2 * | 10/2006 | Charbonneau | B65G 1/026 |
| | | | 414/276 |
| 8,054,233 B2 * | 11/2011 | Holt | H01Q 3/08 |
| | | | 343/763 |
| 8,152,378 B2 * | 4/2012 | Tsai | F16C 29/045 |
| | | | 384/57 |

FOREIGN PATENT DOCUMENTS

| | | | | |
|---|---|---|---|---|
| GB | 2204509 A | * | 11/1988 | B05B 13/041 |
| JP | 2015212520 A | * | 11/2015 | E05D 15/06 |
| KR | 20050119512 A | * | 12/2005 | B23Q 1/42 |

* cited by examiner

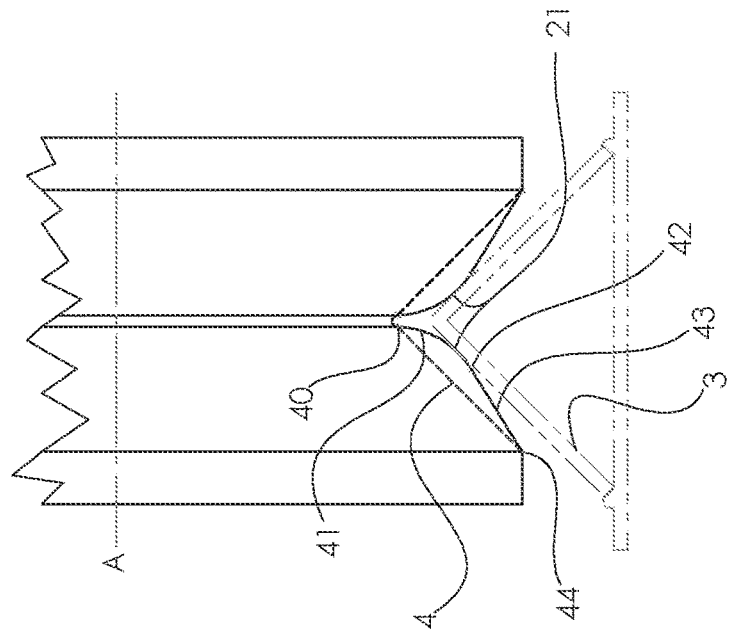
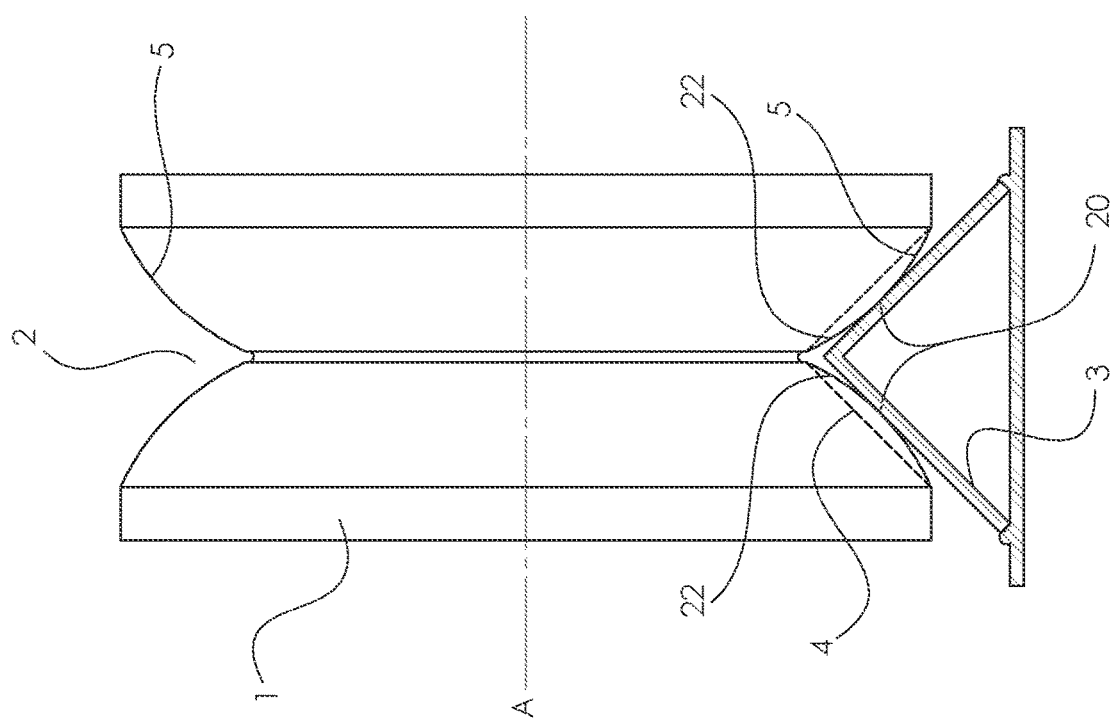

ROLLING APPARATUS WITH PROFILED V-GUIDE

BACKGROUND OF THE INVENTION

The present invention relates to guided rollers and tracks, and more particularly to guided rollers and tracks associated with track-guided, loading bearing movement applications.

There are a wide range of industrial applications that involve moving materials and objects over a track. For example, many linear guided systems involve the use of guided rollers specially configured to follow a track. Other examples include the use of guided rollers as wheels or casters on carts and trolleys that follow tracks that may be mounted on or embedded within the floor.

In many of these applications, the guided rollers and tracks have corresponding non-linear cross sections, such as V-shaped or circular, that help to ensure the guided rollers follow the track. The tracks provide thrust-loading capacity, as compared to rollers or casters with a flat outer profile rolling on a flat track, and ensure proper transport patterns of the moving devices. Typically a combination of guiding, grooved rollers and unguided flat idler rollers are used to support the moving load due to the generally lower cost of a flat roller and the higher rolling resistance associated with the guiding rollers. In some cases, such as U.S. Pat. No. 4,520,722 to Willmann, the roller is supported by the track at the innermost portion of the groove, with the sides of the groove acting merely to provide guidance or to increase friction when in contact with the track.

V-grooved roller bodies have a far higher rolling resistance than their flat (non-profiled) counterparts, thought to be due to the comparatively long contact interface and the varying rotational velocities along the contact interface on either side of the track. This greater friction and slippage promulgates as less efficient movement, increased track rubbing wear, and increased frictional heat.

The above problems can be somewhat alleviated by using a round-bar track as the roller guide. However, this much smaller contact interface generates both far higher contact stresses and prevents an avenue of track cleaning inherent to flat-on-flat contact, wherein debris present on the track is naturally swept away by the varying rotational velocities along the flat groove profile. Both effects can bring about wear that ultimately negates the benefits of using the round-bar track.

SUMMARY OF THE INVENTION

The present invention provides a rolling body for track-guided applications with the traditional guiding and thrust-loading capabilities and with the benefit of significantly lowered rolling resistance by creating a non-linear groove profile on the roller body. In one embodiment, the rolling body includes a pair of interface surfaces arranged to cooperatively form a generally V-shaped groove configured to ride on a corresponding V-shaped track. The interface surfaces of the body are non-linear so that there is essentially a point contact interface between each interface surface body and the corresponding surfaces of the track. For example, the interface surfaces of the body may be slightly convex following a curve with a relatively large radius.

Collapsing the line contact interface of the groove to a point contact interface shrinks the wear area, lowers the frictional heat losses, and reduces rolling resistance significantly. This reduction to a point contact can be accomplished by replacing the linear nature of the side of a V-groove, as an example of one embodiment, with a portion of a 'crown' of a large-radius circular arc, for example. Unlike the drastic curvature of a round-bar track, a subtle curvature allows for debris sweeping, maintaining all the desired advantages for only a small increase in contact stress.

The crowned profile can, additionally or alternatively, be implemented on the guiding track using the same techniques and providing the same benefits, while leaving the rolling body radial groove of a conventional flat-contoured style. For example, the track interface surfaces may be curved (e.g. convex) rather than the rolling body interface surfaces. As another example, the track interface surfaces and the rolling body interface surfaces may both be profiled.

In one embodiment, the non-linear profile of the rolling body and or the track is arranged so that the points of contact between the rolling body and the track are at approximately the center of the corresponding interface surfaces. This reduces the maximum separation between the interface surfaces of the rolling body and the track, thereby facilitating debris sweeping over the full interface surfaces. The rolling body and the track may, however, be configured so that the points of contact are elsewhere along the interface surfaces.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 1A is a front view of a rolling apparatus with a crowned V-groove on a flat V-track.

FIG. 1B is a front view of the rolling apparatus of FIG. 1A as modified to include a groove profile having a linear segment and a curved segment.

DETAILED DESCRIPTION

Figure 2:
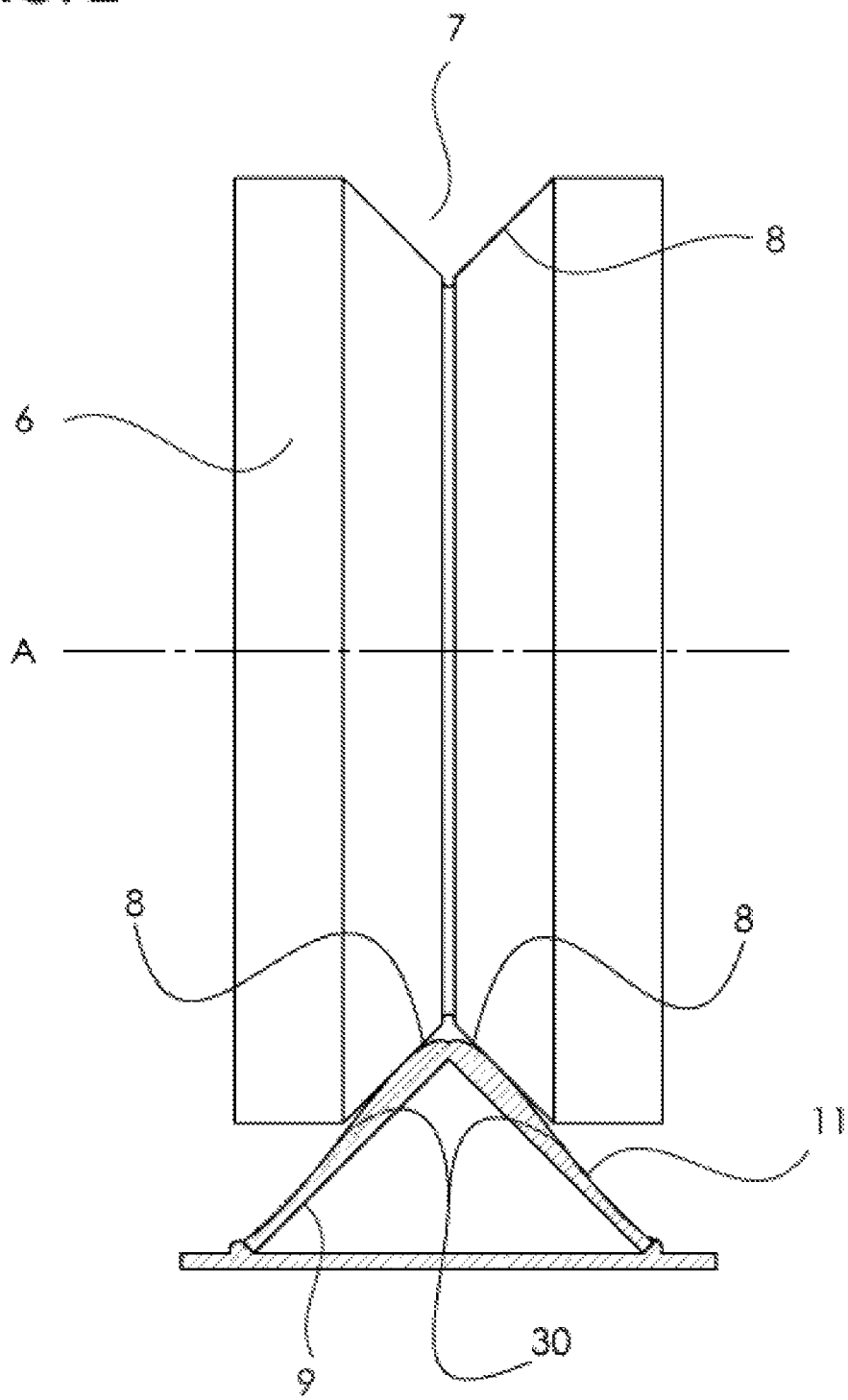
FIG. 2 is a front view of a rolling apparatus with a flat V-groove on a crowned V-track.

A rolling apparatus 1 in accordance with an embodiment of the present invention is shown in FIG. 1A. Referring to FIG. 1A, an example rolling apparatus 1 rotating about Axis A, with radial groove 2, is shown in contact with a representative angle-iron track section 3 with flat sides. The angle-iron track 3 is merely exemplary and the present invention may be implemented for use with other types of track, such as a machined "V" track. Previous roller designs used a flat V-groove profile 4 that matched closely to the profile of the track 3. As the previous roller moved along the track, the interface surfaces of the roller and the track would engage along all or substantially all of the roller profile and track profile, which would generate a long contact interface between the roller body 1 and track 3. Although this sliding/scraping interaction between the rolling apparatus and the track does provide a sweeping function that helps to clean the roller and track, it also results in a high level of rolling resistance.

In the embodiment of FIG. 1A, the present invention describes a rolling body 1 with a non-linear groove profile 5. As shown in FIG. 1A, the rolling body 1 of the illustrated embodiment includes a pair of interface surfaces 20 that cooperate to define a generally V-shaped radial groove 2. The radial groove 2 is configured to engage and ride along the interface surfaces 22 of the track 3.

The profile 5 depicted in FIG. 1A is a portion of a circular arc; other profiles are possible, such as combinations and pluralities of arcs or splines, mathematical functions, or line segments. For example, the rolling apparatus of FIG. 1B include an interface surface 21 defining a groove profile having a curved segment 41 and a linear segment 43. The groove profile starts at 40 and ends at 44, with the curved segment 41 being joined to the linear segment 43 at point 42. The curvature of the interface surfaces 20, 21 has been exaggerated in the drawings for clarity. The curvature is, in typical applications, likely to be significantly greater than illustrated. For example, in the context of a 6½" diameter roller, the profile 5 may have a radius of about 98". However, this is merely exemplary and the curvature may vary from application to application. For example, the radius of curvature may in some applications be at least 50 times greater than the length of the theoretical straight line formed by sectioning the rolling body 1 through the central axis, and in other applications in the range of 50 to 100 times the length of the theoretical straight line formed by sectioning the rolling body 1 through the central axis. It has been determined that utilizing a profile 5 with a greater diameter can be beneficial in that it reduces the maximum separation between the track and the non-contacting portions of the profile 5. More specifically, it reduces the maximum separation between the interface surfaces 20 of the rolling body 1 and the interface surfaces 22 of the track 3, thereby minimizing the impact of the non-linear profile on the debris sweeping function of the rolling body and the track. In typical applications, the maximum separation between the interface surfaces 20 of the rolling body 1 and the interface surfaces 22 of the track 3 is about 0.004", and in some applications is in the range of 0.001" to 0.010".

In the illustrated embodiment, the point of contact between the rolling body interface surfaces 20 and the track interface surfaces 22 is disposed approximately at the center of the rolling body interface surfaces 22. Given that the rolling body interface surfaces 20 follow a circular arc in this embodiment, centering the contact points on the rolling body interface surfaces 20 helps to reduce the maximum separation of the rolling body interface surfaces 20 from the track interface surfaces 22. For example, in the illustrated embodiment, the rolling body interface surfaces 20 follow a portion of a convex circular arc, and the apexes of arcs define the points of contact between the rolling body 1 and the track 3.

As noted above, a non-linear profile may be incorporated into the track rather than the rolling body. For example, FIG. 2 shows the inverse situation to FIG. 1A, wherein the rolling body 6, rolling about Axis A, has radial groove 7 with its plain-V interface surfaces 8 in contact with a representative modified, angle-iron track section 9. In this embodiment, the liner track profile, such as track 3 of FIG. 1A, is replaced by a track 9 with a non-linear track profile 11 as described by the present invention, though exaggerated in the drawings for illustrative purposes. As shown, the track 9 includes a pair of interface surfaces 30 oriented at about 90 degrees to one another to receive and support rolling body 6. Although the track 9 of the illustrated embodiment may be a section of angle iron, the design and configuration of the track 9 may vary from application to application. For example, the track may be machined from a solid component or may be formed by bending, molding, casting, shaping, extruding or essentially any other conventional manufacturing techniques. The non-linear track profile 11 shown in FIG. 2 is of a spline type contour, but other profiles are possible, as described above. For example, in the context of a 6½" diameter roller and a track with interfaces oriented at 90 degrees to one another, the spline type contour may follow the function of a hyperbola with a horizontal transverse axis where the general formula is $(x^2/a^2)-(y^2/b^2)=1$ where the positive slope of the asymptote is greater than 50. The transverse axis of the hyperbola would transect the center of the theoretical straight line formed by sectioning the roller body 1 through the central axis. The profile may vary from application to application. For example, the radius of curvature of the spline at the contact point may in some applications be at least 50 times greater than the length of the theoretical straight line formed by sectioning the rolling body 1 through the central axis, and the radius of curvature may vary along the interface surfaces 30. In some applications, the spline or curvature remains in the range of 50 to 100 times the diameter of the roller over the portions of the interface surfaces 30 that overlap the interface surfaces of the rolling body 6. In typical applications, the maximum separation between the interface surfaces 8 of the rolling body 6 and the interface surfaces of the track 9 is about 0.004", and in some applications is in the range of 0.001" to 0.010".

In alternative applications, both the rolling body and the track may have non-linear profiles. For example, in some applications, the interface surfaces of the rolling body and the interface surfaces of the track may both be convex. As another example, one set of interface surfaces may be convex and the other set of interface surfaces may be concave, providing that the curvature of the convex interface surfaces is shallower than the curvature of the convex interface surfaces.

The present invention may be incorporated into essentially any rolling apparatus intended to follow a track. For example, the rolling apparatus may be a track roller, cam follower, caster wheel, or the like. For purposes of this disclosure, the term "rolling body" is used to encompass all types of rolling apparatus. Similarly, the present invention may be incorporated into essentially any track intended to receive a non-linear rolling apparatus, including "V" track and circular track.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A rolling apparatus for following a track comprising:
   a cylindrical rolling body having an angular groove extending about the rolling body, the angular groove having a profile defined by a pair of interface surfaces that provide both axial and radial guidance for the body, wherein each of the interface surfaces of the groove profile include a non-linear contour and are interconnected via a vertex portion, whereby each of the interface surfaces of the rolling body has essentially a single point contact with a track, whereby the vertex portion is spaced apart from the track and is prevented from contacting the track by proximity of the interface surfaces to each other, such that the vertex portion of the angular groove does not contact the track while in motion thereon.

2. The rolling apparatus of claim 1 wherein each of the interface surfaces of the groove profile follow one or more circular arcs or splines.

3. The rolling apparatus of claim 1 wherein the interface surfaces of the groove profile are defined by one or more mathematical function.

4. The rolling apparatus of claim 3 wherein the mathematical function includes at least one polynomial, elliptical, hyperbolic or exponential curve.

5. The rolling apparatus of claim 1 wherein each of the interface surfaces of the groove profile further include a linear segment, such that the interface surfaces include a linear segment and a curved segment.

6. The rolling apparatus of claim 1 wherein each of the interface surfaces of the groove profile include a circular arc having a diameter at least 10 times greater than the diameter of the rolling body.

7. The rolling apparatus of claim 1 wherein the single point of contact for each interface surface is at or near the center of the interface surface.

8. A guiding track for guiding a rolling apparatus, the rolling apparatus including a rolling body, the guiding track comprising:
   a multisided track having a first side section joined to a second side section along a lengthwise juncture to define a pair of interface surfaces configured to support the rolling body, and wherein the interface surfaces of the multisided track define a track profile, the track profile having a non-linear contour selected to provide a single point of contact between each of the interface surfaces of the multisided track and the rolling body, the multisided track being a load-bearing track for transporting the rolling body in a linear direction.

9. The guiding track of claim 8 wherein the interface surfaces of the track profile include one or more circular arcs or splines.

10. The guiding track of claim 8 wherein the interface surfaces of the track profile are defined by one or more mathematical functions.

11. The guiding track of claim 10 wherein the mathematical functions include at least one polynomial, elliptical, hyperbolic, or exponential curve.

12. The guiding track of claim 8 wherein the interface surfaces of the track profile include one or more linear and curved segments.

13. A rolling track system comprising:
   a rolling apparatus having a cylindrical rolling body with an angular groove extending about the rolling body, the angular groove having a groove profile defined by a pair of interface surfaces that provide both axial and radial guidance for the body; and
   a multisided track having a pair of interface surfaces configured to support a rolling apparatus, the track interface surfaces being in engagement with the rolling body interface surfaces; and
   wherein each of the interface surfaces of the rolling body include a non-linear contour and are interconnected to each other via a vertex portion that is spaced apart from the track while the rolling body is in motion along the track, the interface surfaces of the rolling body being selected to provide a single point of contact between each interface surface of the rolling body and each corresponding interface surface of the track, such that the vertex portion of the annular groove is prevented from contacting the track by proximity of the interfaces surfaces to each other.

14. The rolling track system of claim 13 wherein the non-linear contour is a convex or concave curve.

15. The rolling track of system of claim 13 wherein the non-linear contour is a convex circular arc with the apex of the curve defining the point of contact.

16. The rolling track system of claim 13 wherein the non-linear contour includes one or more circular arcs or splines.

* * * * *